March 3, 1931.          R. H. FOSTER          1,794,842
MINNOW BUCKET
Filed Jan. 9, 1930
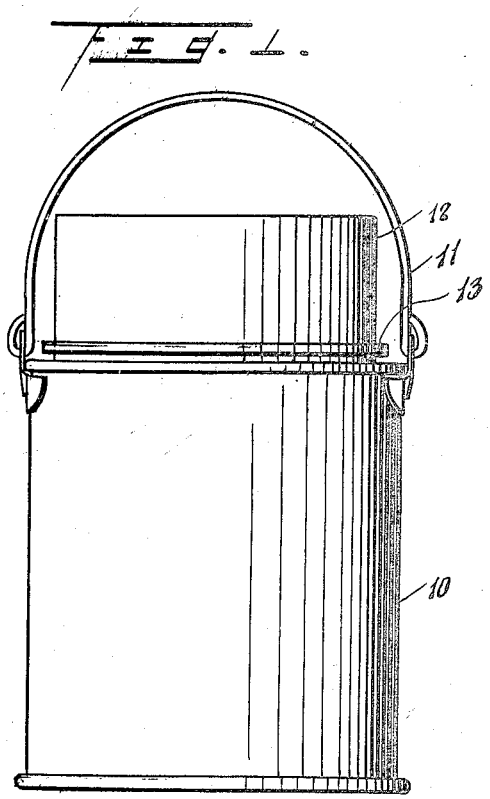
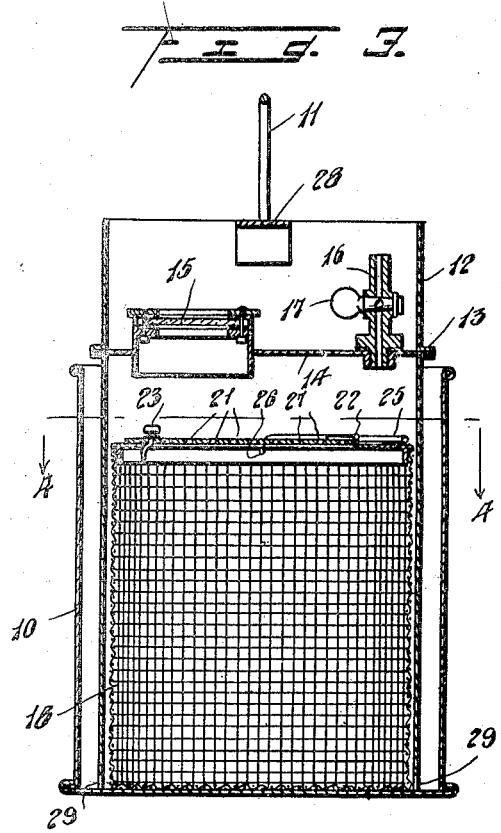
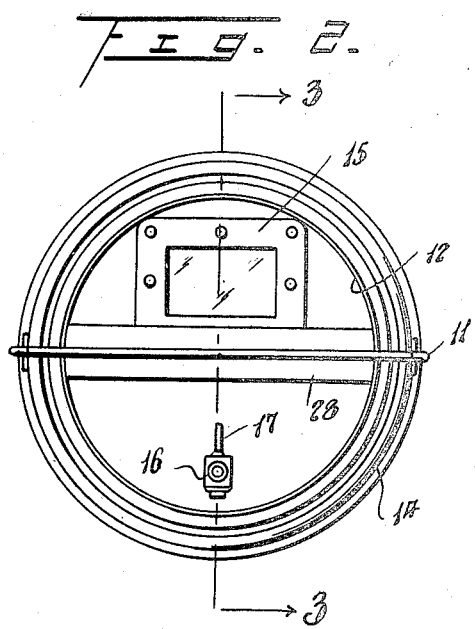
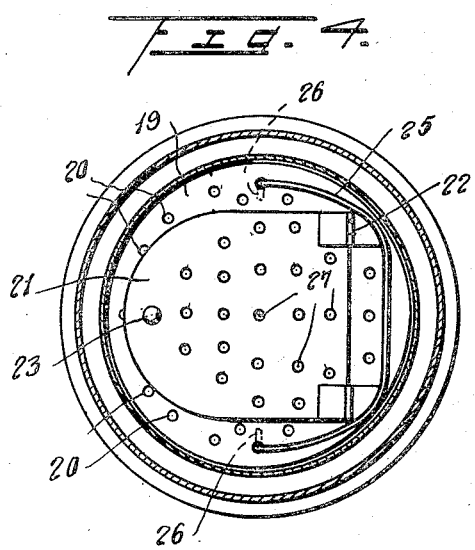
Inventor
R. H. Foster
By L. F. Randolph Jr.
Attorney Patented Mar. 3, 1931

1,794,842

UNITED STATES PATENT OFFICE

RALPH H. FOSTER, OF BURKBURNETT, TEXAS, ASSIGNOR OF ONE-FOURTH TO CLYDE J. BOHNER, OF BURKBURNETT, TEXAS

MINNOW BUCKET

Application filed January 9, 1930. Serial No. 419,642.

This invention relates to a bait or minnow bucket.

It is primarily aimed to provide a bucket wherein a large number of minnows or live bait may be transported, for instance in an automobile from the place where they are caught to the place where they are to be used.

Another object is to provide a construction whereby fresh air may be substantially continuously moved through the water in which the bait is carried.

Another object is to provide a construction wherein the air may be drawn through the water by the suction action of an internal combustion motor whether on an automobile, in a motor boat or otherwise.

A further object is to provide a construction wherein a removable minnow cage is employed in combination with a removable hood to fit over the same and within the bucket.

Various additional objects and advantages will become apparent from a consideration of the description following taken in connection with accompanying drawings illustrating an operative embodiment.

In said drawings:—

Figure 1 is a view of the minnow pail in side elevation, in connection with an intake manifold, Figure 2 is a plan view of the pail, Figure 3 is a central vertical sectional view through the pail taken on the line 3—3 of Figure 2, and Figure 4 is a cross section taken on line 4—4 of Figure 3.

Referring specifically to the drawings, a bucket or pail is employed at 10, open at the top, and being provided with a pivoted bail 11, such bucket being of imperforate material and adapted to contain water.

Removably disposed within the bucket is a tubular hood or shell whose walls above the bucket 10 is contracted at 13 to form a groove in which the margin of a partition 14 is disposed and clinched. Such partition 14 is provided with any suitable type of transparent window as at 15 and in addition has a nipple 16 connected thereto provided with a cut-off valve 17 therein, the nipple communicating with the interior of the hood.

Removably disposed within the bucket and surrounded by the hood normally, is a cage 18 of foraminous or porous metallic wire or other material in which minnows are adapted to be disposed. The cage 18 has a metallic top 19 secured thereto in any suitable manner which is perforated at 20 so that water and air may freely pass through the same. Such cover 19 has a door 21 pivoted thereon as at 22 so that it may be swung upwardly and which door has a conventional latch 23 whereby it may be secured in closed position. In addition, a bail 25 has terminals 26 loosely and pivotally disposed in certain of the openings 20, enabling the bail 25 to normally rest flat on the cover 19 as shown in the drawings. Cover or closure 21 is preferably perforated as at 27 for free passage of water and air therethrough.

A reenforcing bar and handle 28 may be provided diametrically of the hood or shell 12 at the top, and the lower edges of such hood or shell are preferably notched as at 29.

In use the bucket is filled with water to a height sufficient to cover minnows or other live bait carried in the cage 18.

In such condition with the pail containing water and minnows or live bait, the nipple 16 may be connected at the interior of an intake manifold of an internal combustion engine of the automobile in which the pail is carried or the internal combustion engine of a motor boat used for fishing purposes, whereby operation of the internal combustion engine, either on the automobile or in the fishing boat or both, will cause a vacuum or suction through the nipple 16 and thus draw in fresh air through the top of the bucket 10 from around the hood, through the notches 22 and through the cage, such fresh air serving to keep the bait or fish alive.

When fishing, the hood or shell 12 may be removed and the cage 18 removed and placed directly in the body of water in which the user is fishing, to better keep the fish alive.

Various changes may be resorted to provided they fall within the spirit and scope of the invention.

I claim as my invention:—

1. A receptacle adapted to contain water and live bait, means whereby air may enter the water, and means for connection to a suction device to cause the entrance of air through said means and through said water.

2. A receptacle adapted to contain water and live bait having a hood, means whereby air may enter the water and said hood, and means whereby a vacuum may be created within the hood to draw said air through said means and said water.

3. A receptacle adapted to contain water and live bait, a hood in said receptacle, a cage within the hood, a connection carried by the hood whereby air may be drawn through the water, and means on said connection for attachment of a suction means thereto.

4. A receptacle adapted to contain water, a cage removably disposed within the receptacle, a hood disposed over the cage and within the receptacle, a partition carried by the hood above the receptacle and a connection on the partition whereby air may be drawn through the water and cage.

5. A receptacle adapted to contain water, a cage removably disposed within the receptacle, a hood disposed over the cage and within the receptacle, a partition carried by the hood above the receptacle and a connection on the partition whereby air may be drawn through the water and cage, said cage being cut away within the receptacle to facilitate entrance of air, the hood having a portion of its wall contracted and clinched about the margin of the partition, and a handle carried by the hood disposed in the same and adjacent the top thereof.

In testimony whereof I affix my signature.

RALPH H. FOSTER.